United States Patent [19]
Sato et al.

[11] Patent Number: 5,777,067
[45] Date of Patent: Jul. 7, 1998

[54] METHOD FOR PRODUCING POLYAMIDE RESIN FROM CAPROLACTAM

[75] Inventors: Shinichi Sato; Masaaki Miyamoto; Kenji Tsuruhara, all of Kitakyushu, Japan

[73] Assignee: Mitsubishi Chemical Corporation, Tokyo, Japan

[21] Appl. No.: 739,296

[22] Filed: Oct. 29, 1996

[30] Foreign Application Priority Data

Nov. 6, 1995 [JP] Japan ................................ 7-286935
Oct. 3, 1996 [JP] Japan ................................ 8-262917

[51] Int. Cl.$^6$ ..................... C08G 73/10; C08G 69/08; C08G 69/16
[52] U.S. Cl. ..................... 528/310; 528/322; 528/323; 528/324; 528/332; 528/481; 528/495; 528/496; 528/499; 528/502 R
[58] Field of Search .................... 528/499, 310, 528/324, 332, 323, 522, 495, 496, 481, 502 R

[56] References Cited

U.S. PATENT DOCUMENTS

| | | | |
|---|---|---|---|
| 3,639,659 | 2/1972 | Nieswandt et al. | 528/499 |
| 4,310,659 | 1/1982 | Yates et al. | 528/323 |
| 4,327,208 | 4/1982 | Lehr et al. | 528/323 |
| 4,436,897 | 3/1984 | Strehler et al. | 528/323 |
| 4,816,557 | 3/1989 | Pipper et al. | 528/499 |
| 4,978,743 | 12/1990 | Selbeck et al. | 528/499 |
| 5,077,381 | 12/1991 | Dellinger | 528/481 |

FOREIGN PATENT DOCUMENTS

| | | |
|---|---|---|
| 0 000 397 | 1/1979 | European Pat. Off. . |
| 0 074 031 | 3/1983 | European Pat. Off. . |
| 0 123 881 | 11/1984 | European Pat. Off. . |
| 0 459 206 | 12/1991 | European Pat. Off. . |

OTHER PUBLICATIONS

Database WPI, Derwent Publications, AN-79-49798, JP-A-54-064593, May 24, 1979.
Database WPI, Derwent Publications, AN-90-071304, JP-A-02-24322, Jan. 26, 1990.

*Primary Examiner*—P. Hampton-Hightower
*Attorney, Agent, or Firm*—Oblon, Spivak, McClelland, Maier & Neustadt, P.C.

[57] ABSTRACT

Disclosed are a method for producing a polyamide resin which comprises the steps of extracting with water a polyamide resin obtained by polymerizing caprolactam in the presence of water; condensing the extracted aqueous solution containing unreacted caprolactam and its low polymerized materials; and polymerizing the condensate by adding an additional amount of caprolactam, the improvement wherein (a) among the low polymerized materials of caprolactam, a cyclic dimer is supplied to a polymerization reactor after subjecting it to ring-opening reaction to give a chain structure material in an amount of 15% by weight or more based on the total amount of the cyclic dimer, or (a') a condensate obtained by condensing said aqueous solution until reaching a water partial pressure of 10 kg/cm$^2$G or more and a temperature of 230° C. or higher is supplied to a polymerization reactor, and then (b) said additional amount of caprolactam is added to the polymerization reactor, and the procedures are repeatedly carried out.

19 Claims, No Drawings

METHOD FOR PRODUCING POLYAMIDE RESIN FROM CAPROLACTAM

BACKGROUND OF THE INVENTION

This invention relates to a method for producing a polyamide resin excellent in quality from caprolactam industrially and good efficiency.

In a polyamide resin produced by polymerizing caprolactam, about 10% by weight of unreacted caprolactam and its low polymerization products (hereinafter referred to as "oligomer") is contained so that it is necessary to remove the oligomer by hot water extraction for obtaining a product.

As a method for treating a diluted aqueous solution containing the oligomer obtained by extracting with hot water, there has been known the method in which the aqueous solution is purified and condensed to supply to a polymerization system and polymerized after addition of fresh caprolactam. For example, in Japanese Patent Publication No. 15663/1965, there is disclosed a method in which an oligomer aqueous solution is purified by an ion exchanger, fresh caprolactam is added to the solution in an amount of 6 to 500 parts by weight based on 1 part by weight of the oligomer and the mixture is polymerized. For polymerizing caprolactam, by presenting a suitable amount of water, caprolactam is hydrolyzed under pressure, then liberating pressure to remove water and polymerization is carried out under normal pressure or reduced pressure. In this case, when the water content at the initial stage is too much, thermal loss at releasing pressure is remarkable and an apparatus is large so that it is industrially not advantageous. Thus, in general, polymerization is carried out in the presence of several % of water based on the amount of caprolactam. However, when the method disclosed in the above-mentioned Japanese Patent Publication No. 15663/1965 is employed, a relatively large amount of caprolactam shall be added to the reaction system for retaining the suitable amount of water in the system since the oligomer aqueous solution contains a large amount of water whereby the method is not satisfactory as an industrial production process.

Also, in Japanese Provisional Patent Publication No. 96891/1976, there is disclosed that condensed oligomers are polymerized with the other polyamide starting materials without conducting separation and purification, and condensation of the oligomers is carried out up to 90% by weight or more, preferably 96% by weight or more, particularly preferably 98% by weight or more, and the condensate is added to the reaction system as solidified fine strips. However, a high concentration oligomer condensate exceeding 90% by weight is troublesome in handling since its viscosity is remarkably high. Further, the oligomer once solidified is hardly dissolved in a polymerization system and involves the disadvantage of causing fish eyes to the product. Also, if the amount of water contained in the condensate containing the oligomer is a little, water must be separately added to the polymerization system whereby it cannot be said that the method is an industrially advantageous process. Further, in Japanese Provisional Patent Publication No. 64593/1979, there is described that for condensing oligomers up to 80 to 90% by weight, the temperature t is maintained at $t \geq 6°$ C.$-320$ (wherein C represents a condensation degree in terms of % by weight) and it is recycled in a melting state to an polymerization apparatus. However, in said publication, there is no clear description that a cyclic dimer which is most difficultly ring-opened is ring-opened, and as shown in Examples mentioned below, the cyclic dimer is scarcely ring-opened under the condensation conditions described in Examples of said publication. Further, when the condensation is carried out at a higher temperature, it results that a condensation degree is lowered under the same pressure conditions. In said publication, the condensation degree must be 80 to 90% so that it can be considered there is no technical thought in said publication to further raise the temperature at the condensation in which the condensation degree in Examples of said publication is near to 90%.

According to the present inventors' knowledge, when the hardly ring-cleavable cyclic dimer is supplied to a polymerization reactor and recycled with an additional amount of caprolactam to the polymerization step, the amount of the cyclic dimer increases until it reaches to a certain equilibrium value, and as the result, much amount of the cyclic dimer is contained in the product. The cyclic dimer has a high melting point (300° C. or higher) and a sublimating property so that it becomes a material causing many troubles such as adhering to a metal mold (injection molding) or adhering to a dice (extrusion molding) by sublimating at molding operation.

SUMMARY OF THE INVENTION

An object of the present invention is to solve the above problems and to provide a method for producing a polyamide resin excellent in quality from caprolactam industrially and good efficiency.

The present inventors have intensively studied to solve the above problems and found that it is important to effect ring-opening (ring-cleavage) of a cyclic dimer which is particularly difficultly ring-opened among cyclic oligomers, and found that water partial pressure and temperature are important factors for conducting ring-opening of the cyclic dimer, whereby they have accomplished the present invention.

That is, the present invention is a method for producing a polyamide resin which comprises the steps of extracting with water a polyamide resin obtained by polymerizing caprolactam in the presence of water, condensing the extracted aqueous solution containing unreacted caprolactam and its low polymerized materials and polymerizing the condensate by adding an additional amount of caprolactam, the improvement wherein (a) among the low polymerized materials of caprolactam, a cyclic dimer is supplied to a polymerization reactor after subjecting it to ring-opening reaction to give a chain structure material in an amount of 15% by weight or more based on the total amount of the cyclic dimer, and then (b) said additional amount of caprolactam is added to the polymerization reactor, and the procedures are repeatedly carried out.

The present invention also comprises a method for producing a polyamide resin which comprises the steps of extracting a polyamide resin obtained by polymerizing caprolactam in the presence of water with water, condensing the extracted aqueous solution containing unreacted caprolactam and its low polymerized materials and polymerizing the condensate by adding an additional amount of caprolactam, the improvement wherein (a) a condensate obtained by condensing said aqueous solution until reaching a water partial pressure of 10 kg/cm²G or more and a temperature of 230° C. or higher is supplied to a polymerization reactor, and then (b) said additional amount of caprolactam is added to the polymerization reactor, and the procedures are repeatedly carried out.

DESCRIPTION OF THE PREFERRED EMBODIMENTS

In the following, the present invention will be explained in detail.

For producing the polyamide resin of the present invention, ε-caprolactam is generally used as a starting material. Further, in addition to ε-caprolactam as a main component, a component copolymerizable with ε-caprolactam includes, for example, lactams such as 11-aminoundecanoic acid, hexamethylenediamine-adipic acid salt, hexamethylenediamine-sebacic acid salt, hexamethylenediamine-azelaic acid salt, hexamethylenediamine-terephthalic acid salt, isophoronediamine-adipic acid salt, etc., or a copolymerized polyamide obtained by copolymerizing a salt of a diamine and a dicarboxylic acid.

These polyamides are generally obtained by subjecting caprolactam to ring-opening by hydrolysis at a pressure of 20 kg/cm$^2$G or less, preferably 2 to 10 kg/cm$^2$G at a temperature of 240° to 290° C. in the presence of water, then liberating pressure, and to polycondensation at around the same temperature as above and a normal pressure or under reduced pressure up to several dozens of Torr.

Extraction of the oligomer can be carried out by the conventionally known method, and hot water alone, hot water containing caprolactam and a stabilizer, etc. may be used. As the extracting operation, several steps of extracting operation using hot water are preferred.

One of the most important point of the present invention is that a cyclic dimer in the aqueous solution obtained as mentioned above is subjected to ring-opening in an amount of 15% by weight or more. The ring-opening conditions are not particularly limited but it is preferred to carry out ring-opening in the condensation step mentioned below.

For condensation of an extracted oligomer aqueous solution, any condensation methods conventionally known in the art such as multi-step condensation, etc. can be applied to, but generally condensation is carried out until the oligomer concentration of 70 to 98% by weight, preferably 75 to 95% by weight. Operation is carried out under a pressure of 10 to 30 kg/cm$^2$G, preferably 10 to 20 kg/cm$^2$ G.

In order to subjecting a cyclic dimer to ring-opening to obtain a chain structure material, it is necessary to reach a water partial pressure of 10 kg/cm$^2$ G or more and to reach a condensation degree corresponding to a temperature. For example, at 230° C. and 16.5 kg/cm$^2$G, the concentration becomes 80% by weight, and at 10 kg/cm$^{209}$ $^2$G, it becomes 91% by weight. As a condition for ring-opening the cyclic dimer to a chain structure material, by reaching the reaction system to a water partial pressure of 10 kg/cm$^2$G or more and a temperature of 230° C. or higher, preferably a water partial pressure of 13 kg/cm$^2$G or more and a temperature of 240° C. or higher, more preferably a water partial pressure of 15 kg/cm$^2$G or more and a temperature of 250° C. or higher, the state is then maintained generally for 0.1 to 10 hours, preferably 0.5 to 5 hours.

If the pressure and the temperature is too low, the cyclic dimer is recovered without completely subjecting to ring-opening, and the amount of the cyclic dimer increases with a constant ratio whereby the product becomes defective one containing a much amount of the cyclic dimer. In the ring-opening of the cyclic dimer, there is no disadvantage when the pressure and the temperature are both high, but the temperature is too high, a decomposition rate of the polyamide resin becomes sometimes large so that the temperature is usually set at 350° C. or lower, preferably 300° C. or lower; Also, if the water partial pressure is too high, a water content in the polymerization reaction system to be recycled becomes sometimes too large so that it is usually set to 100 kg/cm$^2$G or less, preferably 30 kg/cm$^2$G or less.

On the other hand, caprolactam and cyclic oligomers other than the cyclic dimer do not require such a high temperature nor a high pressure for making them to chain structure materials.

In the present invention, there is no particular limitation in the method of making the pressure and temperature predetermined levels, but the method in which the water partial pressure is reached to a predetermined pressure by elevating the temperature to a predetermined temperature while maintaining the pressure to a constant value. At this time, other inert gas, etc. may be present.

The cyclic dimer which causes a particular problem in the present invention is ring-opened with a some extent before reaching to the predetermined water partial pressure and temperature, but if it is not reacted to the predetermined water partial pressure and temperature, ring-opening of the cyclic dimer is insufficient and the dimer amount in the product increases as the recycle number increases.

Therefore, among the cyclic oligomers in the aqueous solution obtained by extracting a polyamide resin with water, 15% by weight or more, preferably 25% by weight or more, more preferably 35% by weight or more of the cyclic dimer is subjected to ring opening and made a chain structure material, and then the material is supplied to a polymerization reactor and recovered.

In the present invention, the ring-opening reaction mentioned above may be carried out before or after subjecting to condensation or simultaneously with the condensation.

In the present invention, the condensed oligomers obtained by the above step is supplied to a polymerization reactor in the melting state. If the condensed oligomers are supplied to the polymerization reactor after cooling and solidified, they are hardly dissolved and cause disadvantages of forming fish eyes to the product by remaining therein or bringing about clogging of an apparatus, etc.

Also, in the present invention, oligomers are exposed to high temperatures for a long period of time and disadvantages such as coloring, etc. occur due to a minute amount of oxygen. Thus, it is desirable to severely control particularly to prohibit migration of oxygen for effecting condensation, storage, transferring, etc. of the extracted oligomer aqueous solution.

Polymerization can be carried out by applying to the conventionally known method in which caprolactam is hydrolyzed in the presence of water under pressure to ring-opening, then releasing the pressure to remove water and subjecting to polycondensation under normal pressure or reduced pressure. As a matter of course, a part of the cyclic dimer is ring-opened under the circumstances, but it is insufficient to reduce the cyclic dimer amount only by the above procedure until it does not affect to the product so that strict circumstances (high temperature and high pressure) are independently set for the extracted solution as mentioned above.

A supplied amount of additional fresh caprolactam to the polymerization reactor is usually an amount which enables to carry out recycling steadily or steady state. The water content in the mixture comprising the condensed oligomer and the fresh caprolactam is within the range of 0.5 to 10% by weight, preferably 1 to 4% by weight, more preferably 1.3 to 2.5% by weight based on the total weight of the whole caprolactam and its low polymerized materials. When the fresh caprolactam is supplied in an amount as mentioned above and condensation is carried out with the condensation degree as mentioned above, the water content usually becomes within the above-mentioned range. In this case, the above-mentioned required conditions of water can be satisfied without adding a large amount of fresh caprolactam as described in the method disclosed in Japanese Patent Publication No. 15663/1965 so that it is industrially advantageous. If the water content is not within the above range, the condensation degree or the amount of fresh caprolactam to be supplied may be controlled.

The degree of ring-opening of the cyclic oligomer is different as a matter of course depending on the conditions of a pressure and a temperature in the polymerization reactor, and under the usual polymerization conditions, about 30% or less of the cyclic oligomers based on the recovered amount can be ring-opened. The improved point by the present invention is that the remaining 70% of the cyclic oligomers can be ring-opened as much as possible with the extent that no inconvenience is caused by sublimation of the cyclic dimer when molding a product to be formed.

EXAMPLES

In the following, the present invention will be explained more specifically by referring to Examples but the present invention is not limited by these Examples.

EXAMPLE 1

To ε-caprolactam was added 2.5% by weight of water and the mixture was heated to 285° C. in an autoclave, then the pressure 6 kg/cm$^2$G in the autoclave was gradually reduced and the mixture was further reacted at the reduced pressure shown in Table 1 for 2 hours. Thereafter, the resin was taken out therefrom as a strand and chipped to obtain unextracted pellets. These pellets are extracted with water with counter flow to obtain an aqueous solution containing 8% by weight of organic materials as well as extracted pellets. The total amounts of the extracted unreacted caprolactam and oligomers were 9% by weight in the unextracted pellets. The organic materials in the extract were condensed at a constant pressure of 16 kg/cm$^2$G at up to 270° C. under heating to the concentration of 94% by weight (water partial pressure at this time was 16 kg/cm$^2$G), and then, this conditions were maintained for 2 hours.

The thus obtained chain structure oligomers were thrown into fresh caprolactam and the total weight of the mixture was made the same as the first operation, and the same operations as mentioned above were carried out to obtain pellets.

These operations were repeated five times, and an amount of the cyclic dimer in the product finally obtained was measured. As the results, it was found that the amount was not changed from the product (no recycle) obtained at the first time whereby it was confirmed that good nylon 6 had been obtained. The results are shown in Table 1.

The analytical method of the oligomers is as mentioned below, and the measurement of a relative viscosity ($\eta_{rel}$) of the polyamide resin obtained was carried out according to JIS K6810.

Oligomer analytical method: Caprolactam and cyclic oligomers in an aqueous solution were separated and quantitated by effecting a direct liquid chromatography analysis (LC) at 210 nmUV by using H$_2$O/methanol as an eluent. On the other hand, caprolactam and cyclic oligomers contained in the pellets were separated and quantitated by subjecting to extraction under boiling by using methanol as a solvent and then the extract was analyzed by LC analysis.

EXAMPLE 2

In the same manner as in Example 1 except for condensing the organic materials in the extract to 93% by weight, experiments were carried out. The results are shown in Table 1.

EXAMPLE 3

In the same manner as in Example 1 except for condensing the organic materials in the extract to 90% by weight by heating the material under a pressure of 16 kg/cm$^2$G up to 240° C. (water partial pressure at this time was 16 kg/cm$^2$ G), experiments were carried out. The results are shown in Table 1.

COMPARATIVE EXAMPLE 1

In the same manner as in Example 1 except for condensing the organic materials in the extract to 85% by weight by heating the material under a pressure of 10 kg/cm$^2$G up to 220° C. (water partial pressure at this time was 10 kg/cm$^2$G), experiments were carried out. The results are shown in Table 1.

EXAMPLE 4

Unextracted pellets obtained by copolymerizing 85 parts by weight of ε-caprolactam and 15 parts by weight of the salt of adipic acid-hexamethylene diamine were extracted with water with counter flow to obtain an aqueous solution containing 7% by weight of organic materials as well as extracted pellets. The total amounts of the extracted unreacted caprolactam and oligomers were 7.5% by weight in the unextracted pellets. The organic materials in the extract were condensed at a constant pressure of 16 kg/cm$^2$G at up to 240° C. under heating to the concentration of 90% by weight (water partial pressure at this time was 16 kg/cm$^2$G), and then, this conditions were maintained for 2 hours These operations were repeated five times in the same manner as in Example 1. The results are shown in Table 1.

COMPARATIVE EXAMPLE 2

In the same manner as in Example 4 except for condensing the organic materials in the extract to 85% by weight by heating the material under a pressure of 10 kg/cm$^2$G up to 220° C. (water partial pressure at this time was 10 kg/cm$^2$G), experiments were carried out. The results are shown in Table 1.

TABLE 1

|  | Examples | | | | Comparative examples | |
| --- | --- | --- | --- | --- | --- | --- |
|  | 1 | 2 | 3 | 4 | 1 | 2 |
| Polymerization step reduced degree (Torr) | 450 | 750 | 350 | 450 | 450 | 450 |
| 1st time product |  |  |  |  |  |  |
| $n_{rel}$ | 3.51 | 2.94 | 4.52 | 3.52 | 3.44 | 3.49 |
| Ring-opening degree *1 (%) | 40 | 30 | 20 | 20 | 0 | 0 |
| Cyclic dimer residual ratio *2 (wt. %) | 0.102 | 0.110 | 0.115 | 0.085 | 0.106 | 0.091 |
| 5th time product |  |  |  |  |  |  |
| $n_{rel}$ | 3.48 | 2.96 | 4.50 | 3.53 | 3.49 | 3.51 |
| Ring-opening degree *1 (%) | 40 | 30 | 20 | 20 | 0 | 0 |
| Cyclic dimer residual ratio *2 (wt. %) | 0.093 | 0.113 | 0.125 | 0.081 | 0.191 | 0.163 |

*1: Ring-opening degree of cyclic dimer in the extracted aqueous solution (%)
*2: Residual ratio of cyclic dimer in the product (% by weight)

Compositions of the cyclic oligomers extracted in Example 1 and Comparative example 1 were shown in Table 2.

TABLE 2

| | Low polymerized materials (% by weight) | | | |
| --- | --- | --- | --- | --- |
| | Example 1 | | | Comparative example 1 |
| | 1st time | | 5th time | 5th time |
| | Unextracted pellets | Product pellets | Product pellets | Product pellets |
| Monomer | 7.50 | 0.13 | 0.12 | 0.15 |
| Cyclic dimer | 0.42 | 0.10 | 0.10 | 0.19 |
| Cyclic trimer | 0.41 | 0.16 | 0.15 | 0.17 |
| Cyclic tetramer | 0.35 | 0.20 | 0.21 | 0.21 |
| Cyclic pentamer | 0.28 | 0.26 | 0.25 | 0.26 |
| Total | 8.96 | 0.85 | 0.83 | 0.98 |

From Table 2, it can be found that the cyclic dimer is most likely accumulated but amounts of the other cyclic oligomers are not changed even when they are recycled. That is, when the amount of the cyclic dimer exceeds 0.11% by weight in the product pellets, sublimation phenomenon of the cyclic dimer occurs when molding the pellets so that good final products cannot be obtained.

When a polyamide resin is produced from caprolactam according to the method of the present invention, the resulting polyamide resin has high quality and are in no way inferior to the products produced from caprolactam alone. Further, the oligomers extracted from the polyamide resin can be wholly used again in the polymerization reaction system whereby high yield can be attained so that it is industrially extremely advantageous.

We claim:

1. A method for producing a polyamide resin which comprises the steps of extracting with water a polyamide resin derived from polymerizing caprolactam in the presence of water; condensing the extracted aqueous solution containing unreacted caprolactam and its oligomers at a water partial pressure of 10 to 30 kg/cm$^2$G and at a temperature of at least 230° C.; and polymerizing the condensate directly obtained in a molten state by adding an additional amount of caprolactam, wherein (a) among the oligomers of caprolactam, a cyclic dimer is supplied to a polymerization reactor after subjecting it to ring-opening reaction to give a ring-opened polymer in an amount of 15% to 40% by weight, based on the total amount of the cyclic dimer, and then
   (b) said additional amount of caprolactam is added to the polymerization reactor, and the procedures are repeatedly performed.

2. The method according to claim 1, wherein the polymerization reaction is performed in the presence of water in an amount of 0.5 to 10% by weight based on the total amount of caprolactam and its oligomers.

3. The method according to claim 1, wherein the polymerization reaction is performed in the presence of water in an amount of 1 to 4% by weight based on the total amount of caprolactam and its oligomers.

4. The method according to claim 1, wherein the polymerization reaction is carried out in the presence of water in an amount of 1.3 to 2.5% by weight based on the total amount of caprolactam and its oligomers.

5. The method according to claim 2, wherein the ring-opening reaction of the cyclic dimer is performed until at least 25% or more of the cyclic dimer is ring-opened.

6. The method according to claim 2, wherein the ring-opening reaction of the cyclic dimer is performed until at least 35% of the cyclic dimer is ring-opened.

7. The method according to claim 1, wherein the nng-opening reaction is performed for 0.1 to 10 hours.

8. The method according to claim 1, wherein the ring-opening reaction is performed at a water partial pressure of at least 13 kg/cm2G and a temperature of at least 240° C. for 0.5 to 5 hours.

9. The method according to claim 1, wherein the ring-opening reaction is performed at a water partial pressure of 15 to 30 kg/cm$^2$G and a temperature of 250° to 300° C. for 0.5 to 5 hours.

10. The method according to claim 1, wherein:said condensate contains 70 to 98% by weight of oligomers.

11. A method for producing a polyamide resin which comprises the steps of extracting a polyamide resin derived from polymerizing caprolactam in the presence of water; condensing the extracted aqueous solution containing unreacted caprolactam and its oligomers at a water partial pressure of 10 to 30 kg/cm$^2$G and at a temperature of at least 230° C.; and polymerizing the condensate directly obtained in a molten state by adding thereto an additional amount of caprolactam, wherein (a) a condensate obtained by condensing said aqueous solution until reaching a water partial pressure of 10 to 30 kg/cm$^2$G or more and a temperature of at least 230° C. is supplied to a polymerization reactor, and then (b) said additional amount of caprolactam is added to the polymerization reactor, and the procedures are repeatedly performed.

12. The method according to claim 11, wherein the polymerization reaction is performed in the presence of water in an amount of 0.5 to 10% by weight based on the total amount of whole caprolactam and its oligomers.

13. The method according to claim 11, wherein the polymerization reaction is performed in the presence of water in an amount of 1 to 4% by weight based on the total amount of whole caprolactam and its oligomers.

14. The method according to claim 11, wherein the polymerization reaction is performed in the presence of water in an amount of 1.3 to 2.5% by weight based on the total amount of whole caprolactam and its oligomers.

15. The method according to claim 11, wherein the ring-opening reaction is performed for 0.1 to 10 hours.

16. The method according to claim 11, wherein the ring-opening reaction is carried out at a water partial pressure of at least 13 kg/cm$^2$G and a temperature of at least 240° C. for 0.5 to 5 hours.

17. The method according to claim 11, wherein the ring-opening reaction is performed at a water partial pressure of 15 to 30 kg/cm$^2$G and a temperature of 250° to 300° C. for 0.5 to 5 hours.

18. The method according to claim 11, wherein said condensate contains 70 to 98% by weight of oligomers.

19. The method according to claim 11, wherein said condensate contains 75 to 95% by weight of oligomers.

* * * * *